Jan. 12, 1943.   P. A. MILLER   2,307,943
TUBULAR RIVET AND METHOD AND APPARATUS FOR MANUFACTURING THE SAME
Filed March 14, 1941

Witness
Charles T. Olson

Inventor
Paul A. Miller
by his attorneys
Fish, Hildreth, Cary

Patented Jan. 12, 1943

2,307,943

UNITED STATES PATENT OFFICE 2,307,943

TUBULAR RIVET AND METHOD AND APPARATUS FOR MANUFACTURING THE SAME

Paul A. Miller, Wollaston, Mass., assignor to Tubular Rivet & Stud Company, Wollaston, Mass., a corporation of Massachusetts Application March 14, 1941, Serial No. 383,324

2 Claims. (Cl. 10—27)

The present invention relates to tubular rivets, and methods and apparatus for manufacturing the same.

Tubular rivets are frequently made by punching a tapered hole in the shank end of the rivet. This method is not only expensive, in that the punch, being heavily loaded, breaks readily, but is also disadvantageous in that the rivets are not of the proper shape or structure for many purposes. The hole can be made only of limited depth, and the wall is necessarily steeply tapered. Rivets thus made do not clinch smoothly except with the application of excessive pressure, which may result in damage to the rivet or to the parts secured thereby.

Tubular rivets are also commonly made by drilling. Although this method can produce a hole of any desired depth, one of its principal disadvantages is that in mass production it is practically impossible to maintain the holes properly centered. Accordingly, the rivet will not roll or clinch evenly. This type of rivet is also characterized by circumferential tool marks which resist uniform clinching. The method is expensive, not only because of the wastage of material, but also in the manufacturing difficulties of properly chucking the blanks and centering the drills.

One of the objects of the present invention is to produce a tubular rivet in which the hole is properly centered, of uniform diameter and of substantially any desired depth; and which is of the proper metal structure to impart proper clinching characteristics.

Another object of the invention is to provide a simple and inexpensive method of manufacture, whereby the rivets may be produced with uniform characteristics and without material waste.

With these and other objects in view, as will hereinafter appear, the present invention comprises the article, method and apparatus hereinafter described and particularly defined in the claims.

Figure 1:
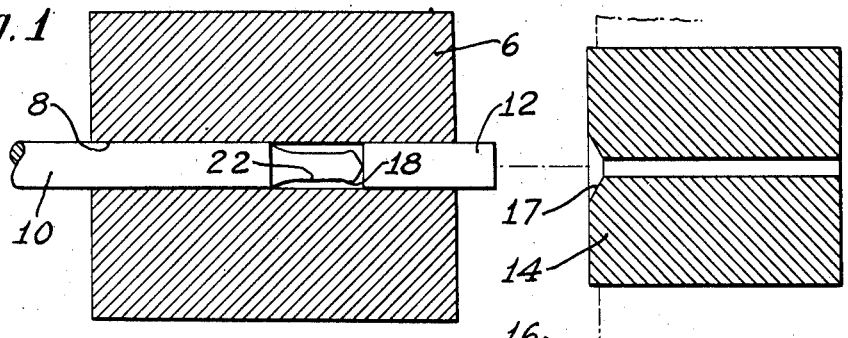
Figure 2:
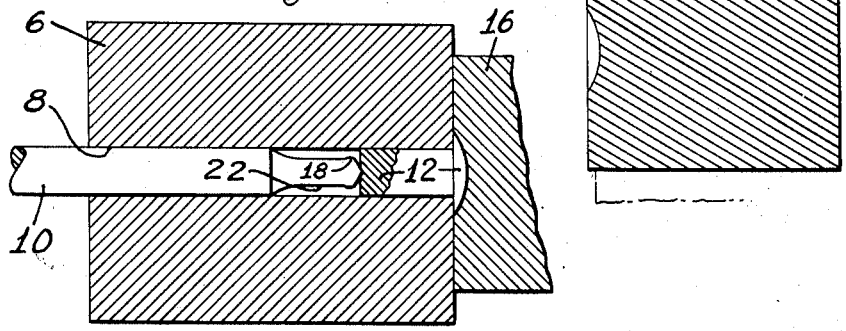
Figure 3:
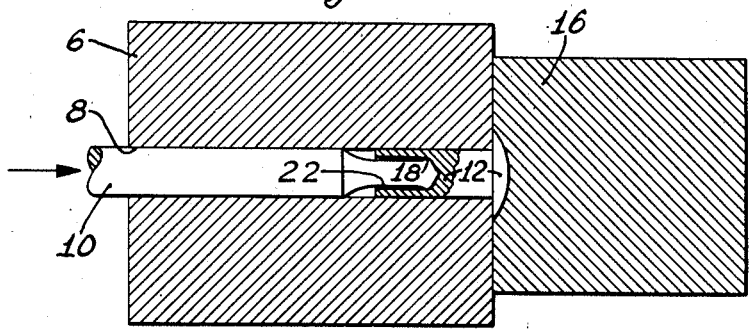
Figure 4:
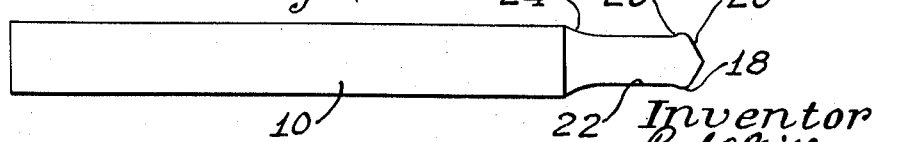

In the accompanying drawing, Fig. 1 is a diagrammatic sectional elevation of the preferred form of apparatus for practicing the present invention; Fig. 2 is a view of the same apparatus subsequent to the heading operation; Fig. 3 is a sectional view of the apparatus after the formation of the hole; and Fig. 4 is an elevation on an enlarged scale of the preferred construction of the forming pin.

The illustrated embodiment of the invention comprises a die 6 having an accurate central hole 8, in which is supported a forming pin 10, later to be described in detail. A blank 12 of rod or wire is received in the hole 8, one end thereof protruding sufficiently to permit the formation of the rivet head.

The head is formed by heading dies or hammers, shown at 14 and 16 of Fig. 1. The hammer 14 is provided with a conical die surface 17 to knock over the protruding portion of the blank 12, following which the hammer 16 is brought against the blank to form the rivet head of suitable shape. The two hammers 14 and 16 are used successively when moderately large heads are to be formed. For small heads, a single hammer of the type indicated at 16 may be used.

During the heading operation, the blank 12 may be backed up by any suitable member inserted in the hole 8 of the die, but preferably by means of the forming pin 10, which is immediately thereafter to be used for formation of the hole in the rivet shank. The pin 10 has a long shank portion to slide in the hole 8 of the die. Near its forward end, the pin has a short working section 18, which is of the same diameter as the hole to be formed in the rivet. The extreme forward end of the pin is preferably a tapered blunt point 20.

In back of the working portion 18, the pin is undercut to form a relief portion 22 of slightly smaller diameter than the portion 18. The relief portion 22 joins smoothly with the shank and with the working section along fillets 24 and 26. The working section 18 is relatively short, as will hereinafter be explained, and has its edges smoothly rounded or filleted, as indicated in Fig. 4. The working section 18 is accurately centered with respect to the shank.

At the conclusion of the heading operation, the parts are as indicated in Fig. 2. The tapered end 20 of the forming pin has penetrated slightly into the end of the rivet blank, after the manner of a prick punch. This slight penetration is desirable to center the pin with respect to the blank, but is not essential, and the pin may be made with a flat or rounded end, if desired.

After the heading operation and while the blank is firmly held by the hammer 16, the forming pin is driven forcibly into the end of the rivet shank for the formation of the tubular hole, as indicated in Fig. 3. This may be done by any suitable mechanical means, preferably by a cam, not shown in the drawing. The formation of the hole is accomplished by a single rapid continuous impact stroke, which results in a flow of metal uniformly around the circumference of the working portion 18 of the forming pin and in a longitudinal direction opposite to the stroke of the pin. Any vibratory or intermittent effects must be avoided in order that the metal flow may be smooth and continuous. The diameter of the hole is determined by the diameter of the portion 18. The forming operation is performed cold, except for such heat as is generated by the energy of the working stroke.

As indicated in Fig. 3, the metal does not close in around the relief portion 22 in back of the working portion. If the relief section were not provided, the frictional resistance to metal flow would prevent proper formation of the hole and might result in breakage of the forming pin. In the construction shown, the only frictional resistance to the flow of metal is that caused by the working portion 18 of the pin, which, as heretofore noted, is made very short, preferably about .005" for rivets of small diameter, and usually not more than 1/64" for rivets of the largest sizes.

The depth of the tubular rivet hole is determined by the stroke of the forming pin. As indicated in Fig. 3, the flow is stopped while the end of the rivet shank still lies above the reduced or relief portion of the forming pin. A hole of greater or less depth would be formed by imparting a longer or shorter working stroke to the pin, and the maximum depth with any given pin is determined by the amount of metal flow that would cause the end of the rivet shank to stop just short of engagement with the fillet 24. The over-all length of the rivet is determined by the initial length of the blank which is gaged in relation to the pin stroke and size of hole so that the length of the rivet and the depth of the hole may be accurately predetermined.

Following the forming operation illustrated in Fig. 3, the hammer 16 is backed away and the motion of the forming pin is continued to eject the completed rivet from the die. The rivet may be stripped from the forming pin either manually or by any suitable stripping device. The stripping is readily accomplished because the rivet hole is of uniform diameter, equal to or very slightly greater than the diameter of the working portion 18 of the pin.

The method described above has important advantages in simplicity and economy. The method is particularly adaptable to mass production, and results in exceptional uniformity of the finished product. The manufacturing operations are carried out without waste of material. The forming pins may be inexpensively manufactured and may be used for an unusually large number of operations without excessive wear, because the only wear is due to the frictional engagement over a short portion of the length. The manufacturing costs are reduced by the fact that only a single forming pin is required for all rivets of the same shank and hole diameters, regardless of the depth of hole. Furthermore, the invention requires the blank to be supported at only one place, all necessary heading and shank-forming operations being performed without transporting the blank from one support to another.

In addition to the manufacturing advantages above noted, the product itself has certain desirable qualities not attained by other methods of manufacture. In the first place, the depth of the hole is not limited by any inherent features of the manufacturing operation. The wall thickness is uniform, and in this respect the rivet is distinguished from the conventional rivets formed by the punch or drilling methods. Furthermore, the rivet is characterized by longitudinal rather than circumferential tool marks, and the grain is longitudinal. The rivet clinches more firmly and smoothly than the usual drilled rivet. Another advantage over the drilled rivet is that the forming operation produces a desirable amount of uniform work hardening in the shank.

Rivets may be made according to the present invention in substantially any size and of substantially any metal or alloy, such as aluminum, brass, copper or steel. An example of a type of rivet easily made according to the present invention is one having a shank .120" in diameter with a hole .094" in diameter and $\frac{3}{16}$" in depth. Rivets of such dimensions could not, so far as I am aware, be made by any prior method other than drilling, but the drilled rivets would almost certainly exhibit off-center and inclined holes, and would have defective clinching properties. The invention is not, however, limited to rivets of small shank diameters, as in the foregoing example, but is applicable to rivets of any size.

Having described my invention, I claim:

1. A method of making a tubular rivet of uniform wall thickness and longitudinal grain which consists in supporting a blank in a die of substantially uniform cross-section throughout its length, engaging the blank with a forming pin having a working portion at its end and a relief portion in back of the end, and effecting, in a single continuous stroke, relative movement between the forming pin and the blank while the latter remains fully supported in the die, to form a tubular shank by flow of metal about the working portion of the pin, said metal flow terminating within the limits of the relief portion of the pin.

2. A method of making a tubular rivet of uniform wall thickness and longitudinal grain which consists in supporting a cylindrical blank in a die, backing up the blank with a forming pin having a working portion and a relief portion, striking the end of the blank with a heading hammer, and thereafter effecting, in a single continuous stroke, relative movement between the forming pin and the blank while the latter is fully retained in the die by the heading hammer, to form a tubular shank by metal flow about the working portion of the pin, said metal flow terminating within the limits of the relief portion of the pin.

PAUL A. MILLER.